United States Patent
Lu et al.

(10) Patent No.: US 11,723,135 B1
(45) Date of Patent: Aug. 8, 2023

(54) INTELLIGENT LIGHTING DEVICE CONTROLLER WITH ADAPTIVE ADJUSTMENT FUNCTION AND METHOD THEREOF

(71) Applicant: Xiamen PVTECH Co., Ltd., Fujian (CN)

(72) Inventors: Fuxing Lu, Fujian (CN); Rongtu Liu, Fujian (CN); Chun Ming Liu, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 17/890,281

(22) Filed: Aug. 18, 2022

(30) Foreign Application Priority Data

May 16, 2022 (CN) .......................... 202210528260.0

(51) Int. Cl.
*H05B 45/325* (2020.01)
*H05B 47/105* (2020.01)
*H05B 45/50* (2022.01)

(52) U.S. Cl.
CPC ......... *H05B 47/105* (2020.01); *H05B 45/325* (2020.01); *H05B 45/50* (2020.01)

(58) Field of Classification Search
CPC ...... H05B 45/10; H05B 45/30; H05B 45/325; H05B 45/50; H05B 47/105
See application file for complete search history.

(56) References Cited

U.S. PATENT DOCUMENTS

2021/0282241 A1\* 9/2021 Gao ..................... H03K 5/1565

\* cited by examiner

*Primary Examiner* — Jimmy T Vu
(74) *Attorney, Agent, or Firm* — Winston Hsu

(57) ABSTRACT

An intelligent lighting device controller includes a detecting module, a main power source module and an intelligent control module. The detecting module has a detecting circuit. The main power source module has a plurality of first electrode connectors and a common second electrode connector. The first electrode connectors are connected to the detecting circuit and connected to the first electrodes of a plurality of lighting devices respectively via the detecting circuit. The common second electrode connector outputs an electricity signal to drive the lighting devices. The intelligent control module is connected to the detecting module and the main power source module. The detecting circuit generates a plurality of detecting signals corresponding to the lighting devices respectively. The intelligent control module generates a feedback signal and transmits the feedback signal to the main power source module. The main power source module adjusts the electricity signal according to the feedback signal.

10 Claims, 4 Drawing Sheets

INTELLIGENT LIGHTING DEVICE CONTROLLER WITH ADAPTIVE ADJUSTMENT FUNCTION AND METHOD THEREOF

BACKGROUND OF THE INVENTION

1. Field of the Invention

The present invention relates to an intelligent lighting device controller, in particular to an intelligent lighting device controller with adaptive adjustment function. The present invention further relates to the adaptive adjustment method of the intelligent lighting device controller.

2. Description of the Prior Art

As growth of environmental awareness, energy saving has become the common objective of all lighting device manufacturers. Many energy-saving lighting devices have been developed so as to realize the above objective. However, currently available lighting systems have no the adaptive adjustment function. Thus, when one of the lamp tubes of a lighting system malfunctions, the others of the lamp tubes thereof may also malfunction. Accordingly, when the above situation occurs, the user may need to replace the lamp tube malfunctioning or replace the power source, which is inconvenient in use and significantly increases the maintenance cost of the lighting system.

SUMMARY OF THE INVENTION

One embodiment of the present invention provides an intelligent lighting device controller with adaptive adjustment function, which includes a detecting module, a main power source module and an intelligent control module. The detecting module has a detecting circuit. The main power source module has a plurality of first electrode connectors and a common second electrode connector. The first electrode connectors are connected to the detecting circuit and connected to the first electrodes of a plurality of lighting devices respectively via the detecting circuit. The common second electrode connector is connected to the second electrodes of the lighting devices and outputs an electricity signal in order to drive the lighting devices. The intelligent control module is connected to the detecting module and the main power source module. The detecting circuit generates a plurality of detecting signals corresponding to the lighting devices respectively. The intelligent control module generates a feedback signal according to the detecting signals and transmits the feedback signal to the main power source module, such that the main power source module adjusts the electricity signal according to the feedback signal in order to execute the adaptive adjustment function.

In one embodiment, the detecting circuit includes a plurality of detectors corresponding to the lighting devices respectively.

In one embodiment, the intelligent lighting device controller further includes a low-voltage power source module. The main power source module is connected to the detecting module and the intelligent control module via the low-voltage power source module In one embodiment, the lighting devices share the common second electrode connector.

In one embodiment, the detecting module amplifies the detecting signals. The intelligent control module calculates the sum of the detecting signals amplified by the detecting module to generate the feedback signal and transmits the feedback signal to the main power source module.

Another embodiment of the present invention provides an adaptive adjustment method for intelligent lighting device controller, which includes the following steps: connecting the detecting circuit of a detecting module to the first electrodes of a plurality of lighting devices; connecting the common second electrode connector of a main power source module to the second electrodes of the lighting devices, and connecting the first electrode connectors of the main power source module to the first electrodes of the lighting devices respectively via the detecting circuit, and outputting an electricity signal to drive the lighting devices by the main power source module; generating a plurality of detecting signals corresponding to the lighting devices respectively by the detecting circuit; generating a feedback signal according to the detecting signals and transmitting the feedback signal to the main power source module by the intelligent control module; and adjusting the electricity signal according to the feedback signal by the main power source module in order to perform the adaptive adjustment function.

In one embodiment, the detecting circuit includes a plurality of detectors corresponding to the lighting devices respectively.

In one embodiment, the method further includes the following step: powering the detecting module and the intelligent control module via a low-voltage power source module by the main power source module.

In one embodiment, the lighting devices share the common second electrode connector.

In one embodiment, the method further includes the following steps: amplifying the detecting signals by the detecting module; calculating the sum of the detecting signals amplified by the detecting module to generate the feedback signal by the intelligent control module; and transmitting the feedback signal to the main power source module by the intelligent control module.

The intelligent lighting device controller with adaptive adjustment function and the method thereof in accordance with the embodiments of the present invention may have the following advantages:

(1) In one embodiment, the intelligent lighting device controller has a detecting module and an intelligent control module. The intelligent control module can generate a feedback signal according to the detecting signals provided by the detecting module and transmit the feedback signal to the main power source module. Thus, the main power source module can adjust the electricity signal according to the feedback signal in order to execute the adaptive adjustment function. Therefore, when any one of the lighting devices malfunctions, the main power source module can adjust the electricity signal via the adaptive adjustment function in order to avoid that the others of the lighting devices or the main power source module malfunctions because the electricity signal is too high. Accordingly, the lighting devices can always operate in high efficiency and achieve great reliability, which can significantly reduce the maintenance cost of the lighting system.

(2) In one embodiment, the intelligent lighting device controller has the specially-designed detecting module. The detecting module has a detecting circuit, and the first electrode connectors of the main power source module are connected to the detecting circuit and further connected to the first electrodes of the lighting devices respectively. The detecting circuit includes a plurality of detectors corresponding to the lighting devices. As a result, the detecting circuit can generate a plurality of detecting signals corresponding to the lighting devices respectively, such that the precision of the detecting circuit can be enhanced with a view to significantly increase the performance of the intelligent lighting device controller.

(3) In one embodiment, the intelligent lighting device controller has the specially-designed detecting module and the detecting module can amplify the above detecting signals. Then, the intelligent control module can calculate the sum of the amplified detecting signals so as to generate the feedback signal and transmit the feedback signal to the main power source module, the above mechanism can further increase the precision of the detecting module so as to further enhance the performance of the intelligent lighting device controller.

(4) In one embodiment, the intelligent lighting device controller can be further integrated with other functional circuits with an aim of providing more innovative functions, which can be more flexible in use and conform to actual requirements.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
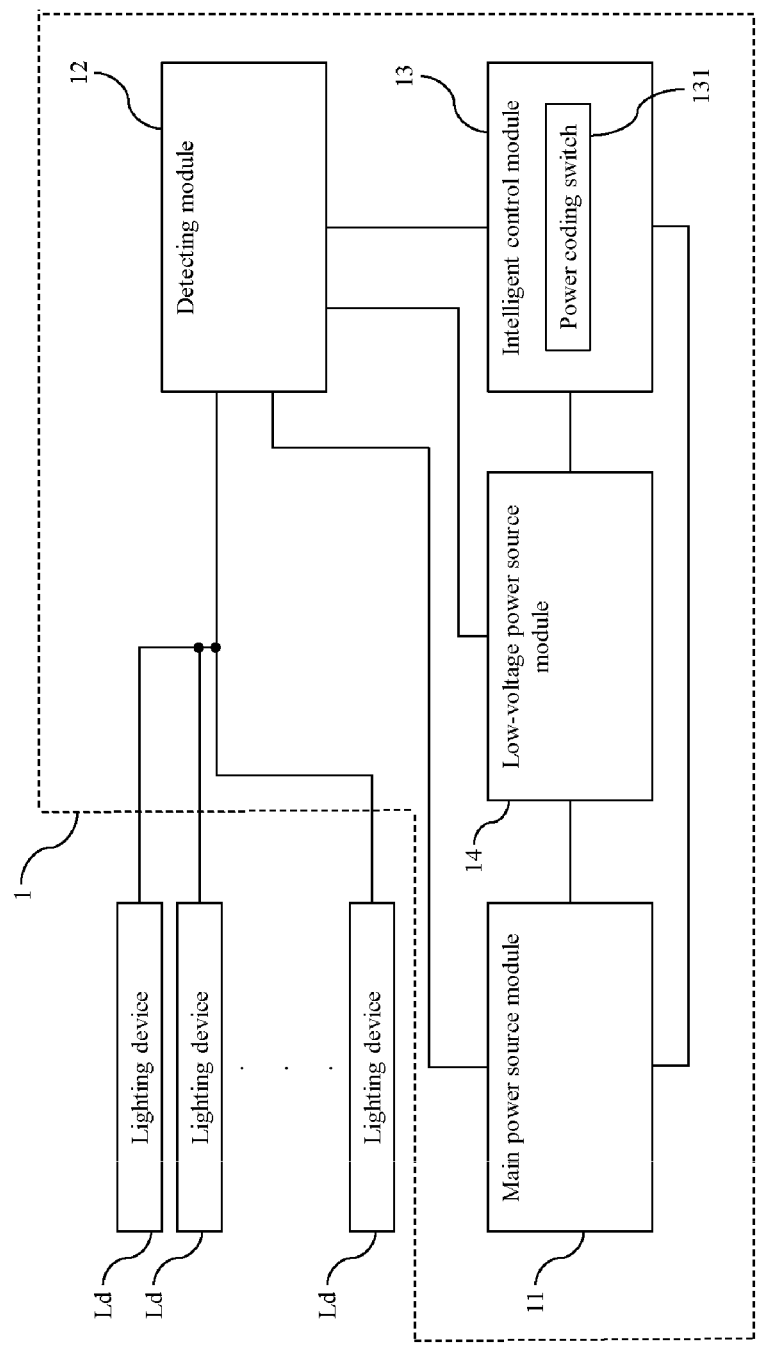
FIG. 1 is a block diagram of an intelligent lighting device controller with adaptive adjustment function in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is a block diagram of an intelligent lighting device controller with adaptive adjustment function in accordance with one embodiment of the present invention. As shown in FIG. 1, the intelligent lighting device controller 1 includes a main power source module 11, a detecting module 12 an intelligent control module 13 and a low-voltage power source module 14.

The main power source module 11 is connected to the detecting module 12, the intelligent control module 13 and the low-voltage power source module 14, and further connected to a plurality of lighting devices Ld via the detecting module 12. In one embodiment, the main power source module 11 may include one or more of a rectifying circuit, a filter circuit, an EMI circuit and a surge-protection circuit, etc., such that the intelligent lighting device controller 1 can stably operate. The main power source module 11 may power the low-voltage power source module 14 and the lighting devices Ld. In one embodiment, the above lighting devices Ld may be light-emitting diode (LED) lamp tubes. The percent flicker of the LED lamp tube is less than 10%. Besides, the LED lamp tube is not polarity-sensitive; that is to say, the LED lamp tube can normally work after connecting to a power source.

The low-voltage power source module 14 is connected to the detecting module 12 and the intelligent control module 13. The low-voltage power source module 14 can generate a low voltage output (e.g., 12V and/or 5V) and provide the voltage stabilizing function in order to drive the detecting module 12 and the intelligent control module 13. In this way, the detecting module 12 and the intelligent control module 13 can normally operate.

The intelligent control module 13 is connected to the detecting module 12 so as to perform the adaptive adjustment function according to the signals generated by the detecting module 12. In one embodiment, the intelligent control module 13 may be a microcontroller unit (MCU), a central-processing unit (CPU), application specific integrated circuit (ASIC) or other similar elements.

The detecting module 12 is connected to the lighting devices Ld and generates a plurality of detecting signals corresponding to the lighting devices Ld respectively. The detecting module 12 can detect the operational statuses of the lighting devices Ld. Besides, when any one of the lighting devices Ld malfunctions, the detecting module 12 can analyze the malfunctioning status of this lighting device Ld.

The embodiment just exemplifies the present invention and is not intended to limit the scope of the present invention; any equivalent modification and variation according to the spirit of the present invention is to be also included within the scope of the following claims and their equivalents.

Figure 2:
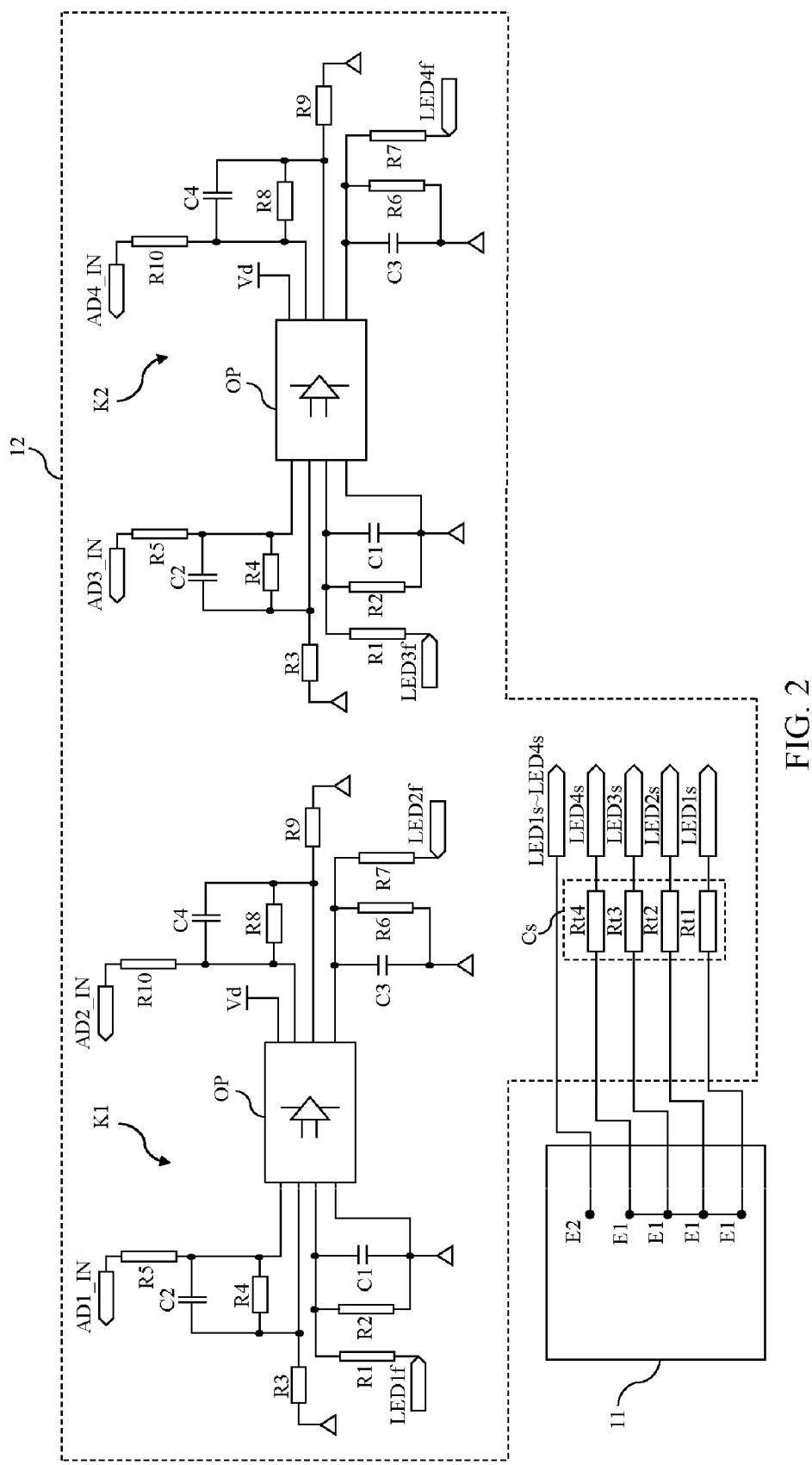
FIG. 2 is a circuit diagram of the intelligent lighting device controller with adaptive adjustment function in accordance with one embodiment of the present invention.
Figure 3:
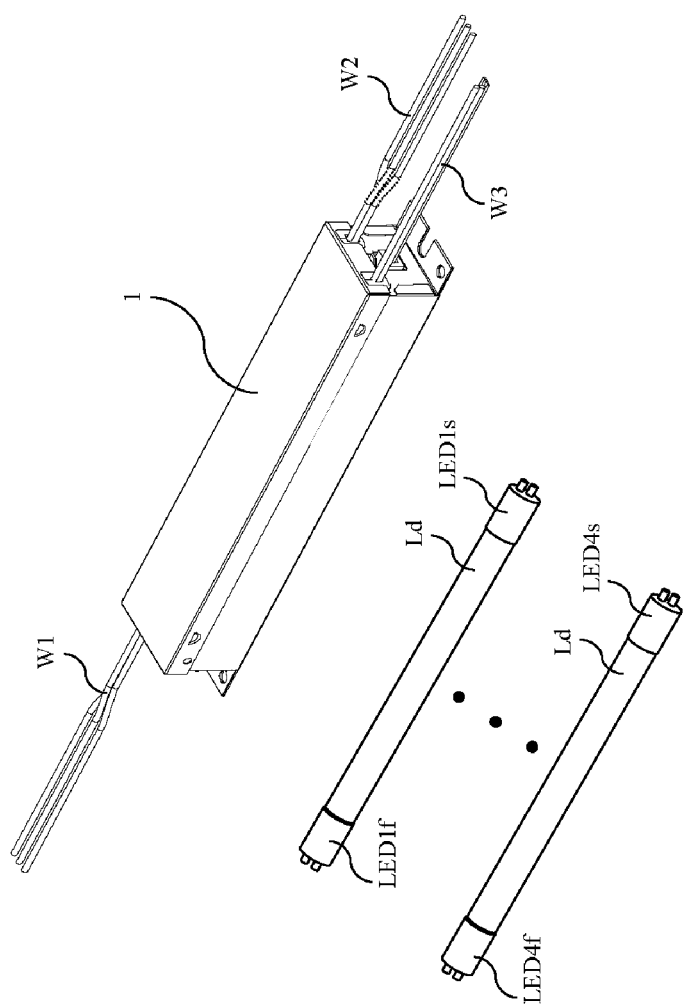
FIG. 3 is a schematic view of the intelligent lighting device controller with adaptive adjustment function in accordance with one embodiment of the present invention.

Please refer to FIG. 2 and FIG. 3. FIG. 2 is a circuit diagram of the intelligent lighting device controller with adaptive adjustment function in accordance with one embodiment of the present invention. FIG. 3 is a schematic view of the intelligent lighting device controller with adaptive adjustment function in accordance with one embodiment of the present invention. As shown in FIG. 2 and FIG. 3, the main power source module 11 has a plurality of first electrode connectors E1 and a common second electrode connector E2. The detecting module 12 has a detecting circuit Cs and operational amplifier circuits K1, K2. The first electrode connectors E1 are connected to the detecting circuit Cs and further connected to the first electrodes LED1f~LED4f of the four lighting devices Ld. The common second electrode connector E2 are connected to the second electrodes LED1s~LED4s of the four lighting devices Ld. The operational amplifier circuit K1 includes resistors R1~R10, capacitors C1~C4 and an operational amplifier OP, and the operational amplifier circuit K1 is connected to the first electrodes LED1f~LED2f of two of the lighting devices Ld. The operational amplifier circuit K2 includes resistors R1~R10, capacitors C1~C4 and an operational amplifier OP, and the operational amplifier circuit K2 is connected to the first electrodes LED3f~LED4f of the others of the lighting devices Ld (Vd is the operational voltage). The quantity of the lighting devices Ld can be changed according to actual requirements. As shown in FIG. 3, the wire W1 is connected to an AC power source (e.g., utility power), and the wire W2 and the wire W3 are corresponding to the first electrode connectors E1 and the common second electrode connector E2. In this way, the second electrodes LED1s~LED4s of the lighting devices Ld can share the common second electrode connector E2, which can reduce the cost of the circuit. The first electrodes may be negative electrodes and the second electrodes may be positive electrodes or the first electrodes may be positive electrodes and the second electrodes may be negative electrodes, such that the lighting devices Ld and the main power source module 11 are not polarity-sensitive. Alternatively, the first electrode connectors E1 can be connected to the detecting circuit Cs and further connected to the first electrodes LED1f~LED4f of the four lighting devices Ld, and the common second electrode connector E2 can be connected to the second electrodes LED1s~LED4s of the four lighting devices Ld. In this case, the intelligent lighting device controller 1 can still work normally.

As shown in FIG. 2, the main power source module 11 can be connected to the lighting devices Ld via the first electrode connectors E1, the common second electrode connector E2 and the detecting module 12 to output an electricity signal so as to drive the lighting devices Ld. Therefore, the main power source module 11 can be connected to the lighting devices Ld via the first electrode connectors E1 and the common second electrode connector E2.

As set forth above, the main power source module 11 outputs the electricity signal in order to drive the lighting devices Ld. The detecting circuit Cs includes a plurality of detectors Rt1~RT4. After the electricity signal passes through the detectors Rt1~Rt4, the detecting circuit Cs can generate a plurality of detecting signals corresponding to the lighting devices Ld respectively. The intelligent control module 13 generates a feedback signal according to the above detecting signals and transmits the feedback signal to the main power source module 11. The detectors Rt1-Rt4 can be resistors or other current detecting elements. The operational amplifier circuits K1 and K2 of the detecting module 12 amplify the detecting signals and transmit the amplified detecting signals AD1_IN~AD4_IN to the intelligent control module 13. The intelligent control module 13 calculates the sum of the amplified detecting signals AD1_IN~AD4_IN in order to generate the feedback signal and transmits the feedback signal to the main power source module 11, such that the main power source module 11 can adjust the electricity signal according to the feedback signal with a view to perform the adaptive adjustment function. As described above, the detecting module 12 can amplify the detecting signals and the intelligent control module 13 can calculate the sum of the amplified detecting signals AD1_IN~AD4_IN to generate the feedback signal and transmit the feedback signal to the main power source module 11. The above mechanism can further enhance the precision of the detecting module 12 with an aim of further enhancing the performance of the intelligent lighting device controller 1.

Accordingly, if any one of the lighting devices Ld malfunctions and cannot normally operate, the main power source module 11 can adjust the electricity signal according to the feedback signal in order to make sure that the others of the lighting devices Ld not malfunctioning can operate in high efficiency and great reliability. For instance, if the four lighting devices Ld (10 W) can normally operate, the total power consumption thereof 4*10W=40 W. if any one of the lighting devices Ld malfunctions, the main power source module 11 can adjust the electricity signal according to the feedback signal so as to perform the adaptive adjustment function. In this case, the main power source module 11 adjusts the electricity signal to make the power output thereof to be 3*10W=30 W. Similarly, if two of the lighting devices Ld malfunction, the main power source module 11 can adjust the electricity signal according to the feedback signal so as to perform the adaptive adjustment function. In this case, the main power source module 11 adjusts the electricity signal to make the power output thereof to be 2*10W=20 W.

In addition, the intelligent control module 13 can further include a power coding switch 131 (as shown in FIG. 1). The user can operate the power coding switch to output a control signal to the intelligent control module 13, such that the intelligent control module 13 can output a pulse-width modulation (PWM) signal to control the power of the electricity signal of the main power source module 11, as shown in Table 1 given below:

TABLE 1

|  | P1-1 | P1-2 | ... | P1-n |
|---|---|---|---|---|
| Code 1 | 0 | 1 | ... | ... |
| Code 2 | 0 | 0 | ... | ... |
| Code 3 | 0 | 0 | ... | ... |
| ... | ... | ... | ... | ... |
| Code n | 0 | 0 | ... | ... |

The PWM signal outputted by the intelligent control module 13 can be expressed by Equation (1) given below:

$$PWM\text{-}Out = n * P1/Pt * Duty * 100\% \quad (1)$$

PWM-Out stands for the PWM signal outputted by the intelligent control module 13; P1 stands for the power types of the lighting devices Ld; n stands for the quantity of the lighting devices Ld; Pt stands for the maximal power of the main power source module 11; Duty stands for the duty cycle of the default dimming signal. In this way, the user can adjust the power of the electricity signal of the main power source module 11 via the above special power coding switch according to actual requirements, such that the lighting devices Ld can always operate in high efficiency.

As previously stated, the intelligent lighting device controller 1 has the detecting module 12 and the intelligent control module 13. The intelligent control module 13 can generate the feedback signal according to the detecting signals provided by the detecting module 12 and transmit the feedback signal to the main power source module 11. As a result, the main power source module 11 can adjust the electricity signal according to the feedback signal in order to execute the adaptive adjustment function. Therefore, when any one of the lighting devices Ld malfunctions, the main power source module 11 can adjust the electricity signal via the adaptive adjustment function in order to avoid that the others of the lighting devices Ld or the main power source module 11 malfunctions because the electricity signal is too high. Accordingly, the lighting devices Ld can always operate in high efficiency and achieve excellent reliability, which can significantly reduce the maintenance cost of the lighting system.

The intelligent lighting device controller 1 has the specially-designed detecting module 12. The detecting module 12 has the detecting circuit Cs, and the first electrode connectors E1 of the main power source module 11 are connected to the detecting circuit and further connected to the first electrodes LED1f~LED4f of the lighting devices Ld respectively. The detecting circuit 12 includes a plurality of detectors Rt1~Rt4 corresponding to the lighting devices Ld. As a result, the detecting circuit Cs can generate a plurality of detecting signals corresponding to the lighting devices Ld respectively, such that the precision of the detecting circuit Cs can be enhanced with a view to significantly increase the performance of the intelligent lighting device controller 1.

The embodiment just exemplifies the present invention and is not intended to limit the scope of the present invention; any equivalent modification and variation according to the spirit of the present invention is to be also included within the scope of the following claims and their equivalents.

It is worthy to point out that a currently available lighting system has no the adaptive adjustment function. Thus, when one of the lamp tubes of the lighting system malfunctions, the others of the lamp tubes may also malfunction. Accordingly, when the above situation occurs, the user may need to replace the lamp tube malfunctioning or replace the power source, which is inconvenient in use and significantly increases the maintenance cost of the lighting system. On the contrary, according to one embodiment of the present invention, the intelligent lighting device controller has a detecting module and an intelligent control module. The intelligent control module can generate a feedback signal according to the detecting signals provided by the detecting module and transmit the feedback signal to the main power source module. Thus, the main power source module can adjust the electricity signal according to the feedback signal in order to execute the adaptive adjustment function. Therefore, when any one of the lighting devices malfunctions, the main power source module can adjust the electricity signal via the adaptive adjustment function in order to avoid that the others of the lighting devices or the main power source module malfunctions because the electricity signal is too high. Accordingly, the lighting devices can always operate in high efficiency and achieve great reliability, which can significantly reduce the maintenance cost of the lighting system.

Further, according to one embodiment of the present invention, the intelligent lighting device controller has the specially-designed detecting module. The detecting module has a detecting circuit, and the first electrode connectors of the main power source module are connected to the detecting circuit and further connected to the first electrodes of the lighting devices respectively. The detecting circuit includes a plurality of detectors corresponding to the lighting devices. As a result, the detecting circuit can generate a plurality of detecting signals corresponding to the lighting devices respectively, such that the precision of the detecting circuit can be enhanced with a view to significantly increase the performance of the intelligent lighting device controller.

Moreover, according to one embodiment of the present invention, the intelligent lighting device controller has the specially-designed detecting module and the detecting module can amplify the above detecting signals. Then, the intelligent control module can calculate the sum of the amplified detecting signals so as to generate the feedback signal and transmit the feedback signal to the main power source module, the above mechanism can further increase the precision of the detecting module so as to further enhance the performance of the intelligent lighting device controller.

Furthermore, according to one embodiment of the present invention, the intelligent lighting device controller can be further integrated with other functional circuits with an aim of providing more innovative functions, which can be more flexible in use and conform to actual requirements. As described above, the intelligent lighting device controller according to the embodiments of the present invention can definitely achieve great technical effects.

Figure 4:
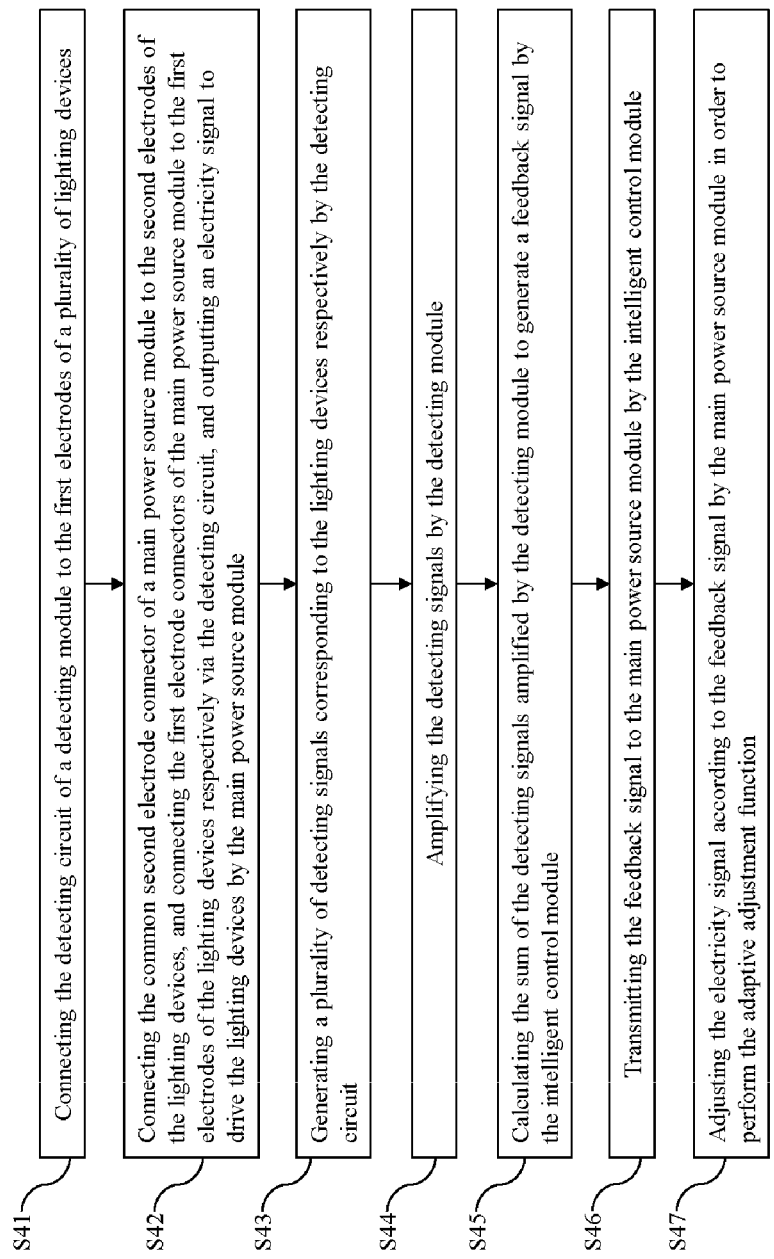
FIG. 4 is a flow chart of an adaptive adjustment method for intelligent lighting device controller in accordance with one embodiment of the present invention.

Please refer to FIG. 4, which is a flow chart of an adaptive adjustment method for intelligent lighting device controller in accordance with one embodiment of the present invention. As shown in FIG. 4, the adaptive adjustment method of the intelligent lighting device controller in accordance with this embodiment includes the following steps:

Step S41: connecting the detecting circuit of a detecting module to the first electrodes of a plurality of lighting devices.

Step S42: connecting the common second electrode connector of a main power source module to the second electrodes of the lighting devices, and connecting the first electrode connectors of the main power source module to the first electrodes of the lighting devices respectively via the detecting circuit, and outputting an electricity signal to drive the lighting devices by the main power source module.

Step S43: generating a plurality of detecting signals corresponding to the lighting devices respectively by the detecting circuit.

Step S44: amplifying the detecting signals by the detecting module.

Step S45: calculating the sum of the detecting signals amplified by the detecting module to generate a feedback signal by the intelligent control module.

Step S46: transmitting the feedback signal to the main power source module by the intelligent control module.

Step S47: adjusting the electricity signal according to the feedback signal by the main power source module in order to perform the adaptive adjustment function.

The embodiment just exemplifies the present invention and is not intended to limit the scope of the present invention; any equivalent modification and variation according to the spirit of the present invention is to be also included within the scope of the following claims and their equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

To sum up, according to one embodiment of the present invention, the intelligent lighting device controller has a detecting module and an intelligent control module. The intelligent control module can generate a feedback signal according to the detecting signals provided by the detecting module and transmit the feedback signal to the main power source module. Thus, the main power source module can adjust the electricity signal according to the feedback signal in order to execute the adaptive adjustment function. Therefore, when any one of the lighting devices malfunctions, the main power source module can adjust the electricity signal via the adaptive adjustment function in order to avoid that the others of the lighting devices or the main power source module malfunctions because the electricity signal is too high. Accordingly, the lighting devices can always operate in high efficiency and achieve great reliability, which can significantly reduce the maintenance cost of the lighting system.

Further, according to one embodiment of the present invention, the intelligent lighting device controller has the specially-designed detecting module. The detecting module has a detecting circuit, and the first electrode connectors of the main power source module are connected to the detecting circuit and further connected to the first electrodes of the lighting devices respectively. The detecting circuit includes a plurality of detectors corresponding to the lighting devices. As a result, the detecting circuit can generate a plurality of detecting signals corresponding to the lighting devices respectively, such that the precision of the detecting module can be enhanced with a view to significantly increase the performance of the intelligent lighting device controller.

Moreover, according to one embodiment of the present invention, the intelligent lighting device controller has the specially-designed detecting module and the detecting module can amplify the above detecting signals. Then, the intelligent control module can calculate the sum of the amplified detecting signals so as to generate the feedback signal and transmit the feedback signal to the main power source module, the above mechanism can further increase the precision of the detecting circuit so as to further enhance the performance of the intelligent lighting device controller.

Furthermore, according to one embodiment of the present invention, the intelligent lighting device controller can be further integrated with other functional circuits with an aim of providing more innovative functions, which can be more flexible in use and conform to actual requirements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An intelligent lighting device controller with adaptive adjustment function, comprising:
    a detecting module having a detecting circuit;
    a main power source module having a plurality of first electrode connectors and a common second electrode connector, wherein the first electrode connectors are connected to the detecting circuit and connected to first electrodes of a plurality of lighting devices respectively via the detecting circuit, wherein the common second electrode connector is connected to second electrodes of the lighting devices and outputs an electricity signal in order to drive the lighting devices; and
    an intelligent control module connected to the detecting module and the main power source module;
    wherein the detecting circuit generates a plurality of detecting signals corresponding to the lighting devices respectively, and the intelligent control module generates a feedback signal according to the detecting signals and transmits the feedback signal to the main power source module, whereby the main power source module adjusts the electricity signal according to the feedback signal in order to execute an adaptive adjustment function.

2. The intelligent lighting device controller with adaptive adjustment function as claimed in claim 1, wherein the detecting circuit comprises a plurality of detectors corresponding to the lighting devices respectively.

3. The intelligent lighting device controller with adaptive adjustment function as claimed in claim 1, further comprising a low-voltage power source module, and the main power source module is connected to the detecting module and the intelligent control module via the low-voltage power source module.

4. The intelligent lighting device controller with adaptive adjustment function as claimed in claim 1, wherein the lighting devices share the common second electrode connector.

5. The intelligent lighting device controller with adaptive adjustment function as claimed in claim 1, wherein the detecting module amplifies the detecting signals, and the intelligent control module calculates a sum of the detecting signals amplified by the detecting module to generate the feedback signal and transmits the feedback signal to the main power source module.

6. An adaptive adjustment method for an intelligent lighting device controller, comprising:
    connecting a detecting circuit of a detecting module to first electrodes of a plurality of lighting devices;
    connecting a common second electrode connector of a main power source module to second electrodes of the lighting devices, and connecting first electrode connectors of the main power source module to the first electrodes of the lighting devices respectively via the detecting circuit, and outputting an electricity signal to drive the lighting devices by the main power source module;
    generating a plurality of detecting signals corresponding to the lighting devices respectively by the detecting circuit;
    generating a feedback signal according to the detecting signals and transmitting the feedback signal to the main power source module by the intelligent control module; and
    adjusting the electricity signal according to the feedback signal by the main power source module in order to perform an adaptive adjustment function.

7. The adaptive adjustment method for the intelligent lighting device controller as claimed in claim 6, wherein the detecting circuit comprises a plurality of detectors corresponding to the lighting devices respectively.

8. The adaptive adjustment method for the intelligent lighting device controller as claimed in claim 6, further comprising:
    powering the detecting module and the intelligent control module via a low-voltage power source module by the main power source module.

9. The adaptive adjustment method for the intelligent lighting device controller as claimed in claim 6, wherein the lighting devices share the common second electrode connector.

10. The adaptive adjustment method for the intelligent lighting device controller as claimed in claim 6, further comprising:
    amplifying the detecting signals by the detecting module;
    calculating a sum of the detecting signals amplified by the detecting module to generate the feedback signal by the intelligent control module; and
    transmitting the feedback signal to the main power source module by the intelligent control module.

* * * * *